UNITED STATES PATENT OFFICE.

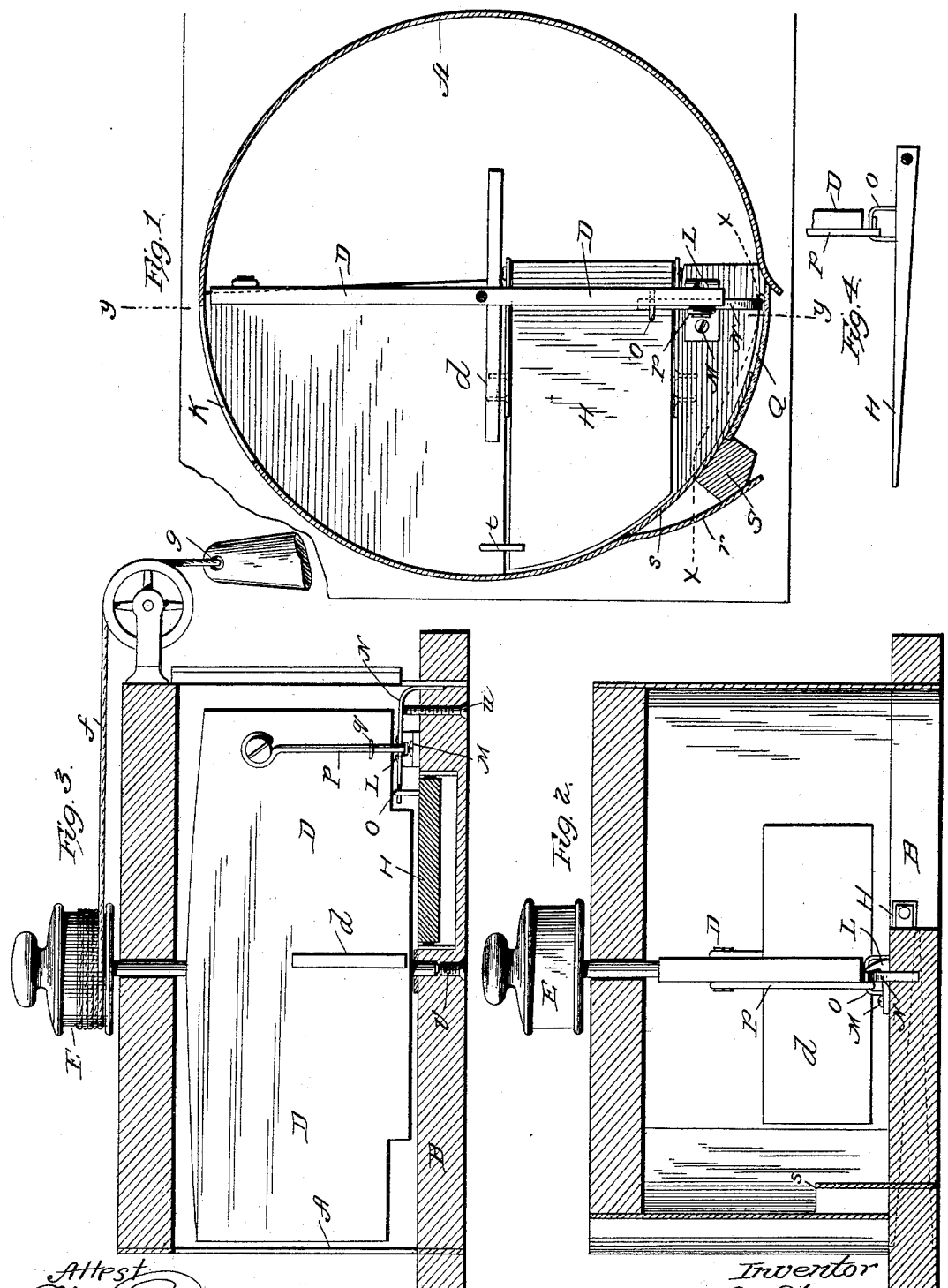

HENRY G. STONE, OF GRAND RAPIDS, MICHIGAN.

ANIMAL-TRAP.

SPECIFICATION forming part of Letters Patent No. 435,779, dated September 2, 1890.

Application filed May 9, 1890. Serial No. 351,164. (Model.)

*To all whom it may concern:*

Be it known that I, HENRY G. STONE, a citizen of the United States of America, residing at Grand Rapids, in the county of Kent and State of Michigan, have invented certain new and useful Improvements in Animal-Traps, of which the following is a specification, reference being had therein to the accompanying drawings.

The invention referred to in the petition is an improvement upon the form of trap shown in Letters Patent of the United States granted to me on the 20th day of September, 1887, and numbered 370,101. The improvement is designed to make the trap more sensitive in its action and also to simplify the parts and reduce the cost of manufacture.

In the accompanying drawings, Figure 1 is a horizontal section through the trap, the parts showing in plan. Fig. 2 represents a vertical section taken on the line $xx$ of Fig. 1. Fig. 3 is also a vertical section taken on the line $yy$ of Fig. 1. Fig. 4 is a detail view.

The main features of the trap are the same as in the aforesaid patent. It has a circular box A on a base-plate B, one-half the box being closed in and an opening cut through the base-plate on the part which is wholly inclosed. It has also revolving partitions or wings D D, which, when the trap is set, extend diametrically across, inclosing the part which contains the hole in the bottom. At right angles to these wings are short wings $d$ $d$, set radially, so that the wings divide the space into quarter-sections, the wings revolving on a vertical spindle, which has a drum E on top outside of the box, and this is worked by a cord and weight $fg$, or it may be worked by a spring. In one of the quarter-sections and upon that side of the box which has the bottom is a trap-door H. This is pivoted next to the opening in the closed half of the trap and extends to the wall on the other side, so that the trap-door substantially fills the quarter-section of the floor inclosed by the short and long wings.

There is an opening for the admission of the animal at K in the wall of the trap. This opens directly onto the solid floor.

By the side of the trap-door next to the wall, opposite the entrance, is a stop-piece L. It is in the form of a catch, consisting of a lip with a shoulder having an inner vertical face, the lip also being slotted in the central part. The stop is held to the floor by a screw M. A thin flat spring N is set in the floor and bent over the stop, so that its edge comes opposite to and bears against the inner face of the slotted lip. The free end of the spring extends over the trap-door and is connected to it by a wire staple O. The spring may be made of a simple flat bit of spring metal, one end of which is stuck into the floor and the other end bent down in the form shown.

On the end of the wings D, and in line with the notches in the lips of the stops, I set projections $p$. These extend downward below the lower edge of the lower wing and just far enough to bear upon the edge of the spring when the trap-door is in its normal position, in which position the spring holds it; but when the free end of the trap-door is depressed it draws the spring down below the end of the projection on the trap-door and releases it, allowing the drum to make a half-revolution and bring the other wing directly opposite into position with the projection upon the spring. Preferably I form this projection upon the wing D out of a piece of wire the upper end of which is bent in the form of an eye and held to the wing by a screw, a small wire staple $q$ holding the other end; but this projection may be fixed upon the wing in any convenient manner. By this construction the action of the trap may be made very sensitive, so that it may be operated by the weight of a very small mouse.

When the trap is set, one of the wings $d$ partially separates the trap-door from the other part and compels the animal to enter on the outer end of the trap-door, where the weight will act with greatest leverage. I make another opening in the wall, as at Q, directly opposite the opening K, and this may be covered with glass or by a mirror. I prefer to form the wall R of the trap out of sheet metal, and an economical way of forming the bait-box consists in extending the end $r$ of this wall in a tangential direction and fastening it to a post S on the outside. A small strip of sheet metal $s$ is fixed to the bottom, one end bearing against the circular part of the wall and the other against the inside of the post, so as to leave a pocket for the bait between the strips and the wall and next to the post, this pocket being located close to the free end of the trap-door, so as to be accessible to the animal when he is on the end of the trap-door. The trap-door is located in a recess in the upper surface of this half-bottom, it being made deep enough to allow for the proper motion of the trap-door. The upward motion of the trap-door is limited by an arm $t$. I have provided a screw $u$ in the bottom, which extends up through the bottom and bears on the under surface of the spring near its point of attachment to the bottom, by means of which the tension of the spring is regulated. The trap acts to sweep the animal in the trap into the hole in its base and it falls into any suitable receptacle underneath. As soon as the animal is swept from the trap-door, the door rises and the projection on the end of the wing again strikes upon the spring, the force of the blow being taken up by the slotted lip, as described. When the trap-door is depressed, this again passes over the spring and through the slot in the lip.

The trap will operate as long as the motive power remains active and will set itself after each action. Where a weight is used, as shown, the weight may be lifted and the cord wound around the drum without moving the wings; but if the wings be permitted slight vertical movement with their spindle, as shown, the wings may be slightly lifted and drawn back to wind the cord on the drum. The elevation of the wings being sufficient to carry the projections over the springs, I have provided a set-screw V in the bottom underneath, so that the lower end of the spindle bears upon it to regulate the height of the wings, so that the projections thereon will catch properly against the edge of the spring without extending down too far so as to require too much motion of the trap-door.

I claim as my invention—

1. In combination, the revolving wings with means for applying a tension thereto, projections on the wings, a movable spring extending normally across the path of the projections and arranged to be moved to release the projections and allow the wings to turn, one end of the spring being connected to the stationary part of the casing and the other end to the movable trap-door, substantially as described.

2. In combination, the revolving wings with means for applying a tension thereto, projections on the wings, a catch-spring movable across the path of the projections to engage and disengage with the same to control the action of the wings, one end of the spring being connected to the casing and the other to the movable trap-door, and a lip on the casing against which the spring bears laterally to prevent displacement of the spring, substantially as described.

3. In combination, the revolving wings with tension means, projections on the wings, a catch-spring movable across the path of the projections to engage and disengage with the same to control the movement of the wings, one end being connected to the casing and the other to the trap-door, and a lip on the casing to prevent lateral displacement of the spring under the action of the projections, the said lip being notched in the line of movement of the projections to allow the same to pass when the spring is operated.

4. In combination, the wings with tension-applying means, the projections on the wings, the catch-spring movable across the path of the projections, one end being fixed to the casing and the other end being connected to the trap-door, to be depressed thereby away from the projections and wings, and an adjusting-screw acting upon the spring to vary its resistance against being depressed, substantially as described.

5. In combination, the casing having a post S outside the line of its main wall, the said wall having a tangential portion $r$ extending outside the post S, and the strip $s$ extending from the main wall to the inside of the post, substantially as described.

6. In combination, the casing, the revoluble wings with operating means therefor, said casing having a passage for the animal, with openings at opposite ends, and the glass or mirror placed in one of said openings, substantially as described.

7. In combination, the casing, the revoluble wings with operating means therefor, said casing having an opening for the entrance of the animal, and a mirror within the casing opposite the entrance-opening, substantially as described.

8. In combination, the casing, the revoluble wings, means for operating the same, a catch engaging said wings, and a spindle carrying the wings, adapted to have a slight vertical movement, whereby the wings will be freed from the catch by raising the spindle, substantially as described.

9. In combination, the casing, the revoluble wings, means for operating the same, a catch for engaging the wings, a spindle carrying said wings adapted to have slight vertical movement, whereby the cord may be rewound by lifting the spindle so as to clear the catch, and an adjustable screw for the spindle, substantially as described.

In testimony whereof I affix my signature in presence of two witnesses.

HENRY G. STONE.

Witnesses:
E. G. HOLDEN,
W. R. FOX.